(No Model.)
J. McCOURT.
METRIC MODEL.
No. 480,119. Patented Aug. 2, 1892.
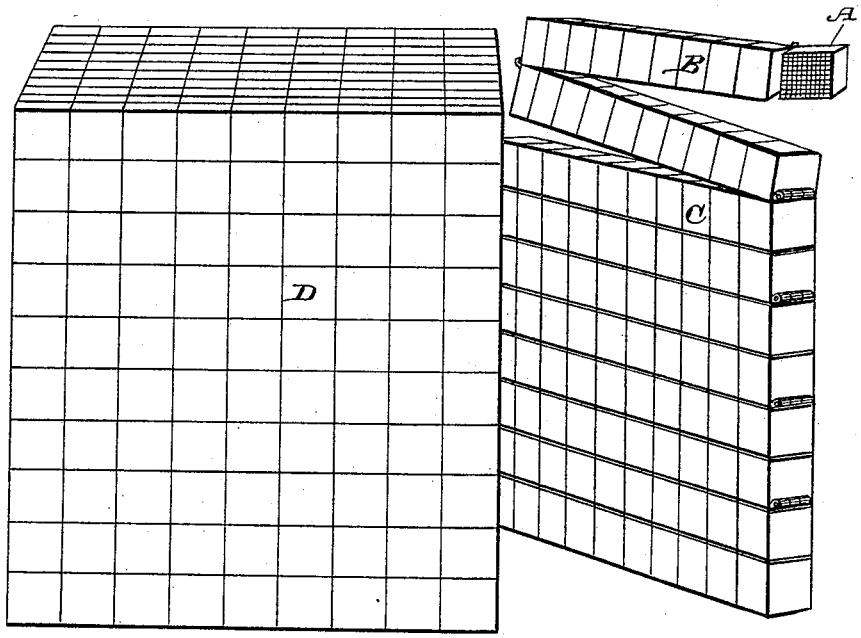
Witnesses,
Inventor,
James McCourt
By Dewey & Co.
att'y

UNITED STATES PATENT OFFICE.

JAMES McCOURT, OF SALEM, OREGON.

METRIC MODEL.

SPECIFICATION forming part of Letters Patent No. 480,119, dated August 2, 1892.

Application filed May 4, 1891. Serial No. 391,563. (No model.)

*To all whom it may concern:*

Be it known that I, JAMES McCOURT, a citizen of the United States, residing at Salem, Marion county, State of Oregon, have invented an Improvement in Metric Models; and I hereby declare the following to be a full, clear, and exact description of the same.

My invention relates to the class of educational and illustrative appliances; and it consists in what may properly be termed a "metric model," the object of which is to illustrate and teach the metric system, the measures of extension, volume, capacity, and weight, the ultimate results of square and cube root, decimals, percentage, discount, interest, involution, logarithms, United States coinage, mensuration, proportion, geometry, fractions, addition, subtraction, multiplication, division, &c.

My invention consists in the peculiarly constructed and divided block hereinafter fully described, and specifically pointed out in the claims.

Referring to the accompanying drawing for a more complete explanation of my invention, the figure is a perspective view of my metric model.

It is a block or cube of suitable material. It is grooved, indented, marked, or has its surface otherwise divided into parts. There are on each surface eighteen marks or lines, nine being at right angles to the other nine and dividing each surface into one hundred squares. The whole cube may thus represent the cubic decimeter. One-tenth part (designated by A B C) of the cube is severed from the solid remainder, which is lettered D, as shown. Said part is severed horizontally into ten strips, hinged together at alternate ends, as shown. Each of these strips is marked off into tenths, and the upper strip (designated B) has one of its tenths A severed and hinged to the adjacent one, whereby it may be turned to one side. The cube A is also marked off into ten divisions, as shown.

Though I have assumed the whole cube to be the cubic decimeter, I may also assume it to be enlarged to represent the cubic meter; or, if desired, I may use another and larger cube, similar to the one shown, the part marked C being in that case preferably solid and hinged to the main part D.

The model illustrates linear measure thus: The markings on the edge of the cube A show ten millimeters or one centimeter. A plus B shows ten centimeters or one decimeter. A plus B plus C show ten decimeters or one meter, and A plus B plus C plus D show ten meters or one decameter. Now let the model represent a cubic meter. Then A plus B show ten decameters, equal to one hectometer. A plus B plus C show ten hectometers, equal to one kilometer, and A plus B plus C plus D show ten kilometers, equal to one myriameter. Similarly the decastere or ten cubic meters cut into strips one centimeter square and placed end to end would extend ten myriameters.

Square measure is illustrated by the model thus: The face of the model shows the square decimeter divided into one hundred square centimeters. The face of small cube A shows the square centimeter divided into one hundred square millimeters. Similarly the face of the model when assumed to be the cubic meter shows one hundred square decimeters. Now assuming each division of cube A to be one meter or the whole side ten meters and the decimeter and meter similarly enlarged, then I have the centiare, the are, and the hectare. Similarly I could enlarge this last square to ten times its size and obtain the kiloare or square kilometer, containing about two hundred and forty-seven acres.

The model illustrates cubic measure or volume thus: The cube A shows the cubic centimeter, equaling one thousand cubic millimeters. A plus D when closed shows one cubic decimeter, equaling one thousand cubic centimeters. Now assume the model when closed to be enlarged to represent the cubic meter, and it then shows one thousand cubic decimeters. Wood measure is thus shown: Assume the model to represent when closed the stere or cubic meter. Then it shows one thousand cubic decimeters. The cube A shows one cubic decimeter or millistere, A plus B show the centistere, A plus B plus C show the decistere, and the whole model when closed shows the stere.

Liquid and dry measures are thus shown: The cube A shows the milliliter, A plus B the centiliter, A plus B plus C the deciliter, and A plus B plus C plus D the liter. Assume the model to be the stere, then A plus B shows the dekaliter, A plus B plus C the hectoliter, and A plus B plus C plus D the kiloliter or ton.

Weights are thus shown: Cube A shows the gram, full size, divided into one thousand milligrams. A and B show the dekagram or ten grams; A, B, and C, the hectogram or ten dekagrams. A, B, C, and D show the kilogram or ten hectograms. Now assume the model to be the cubic meter or stere divided as above. Then A and B show the myriagram or ten kilograms. A, B, and C show the quintal or ten myriagrams; and A, B, C, and D show the metric ton or ten quintals. Now assuming the model to show the gram enlarged to the cubic decimeter, the lower denominations are shown thus: A plus B plus C show the decigram. A plus B show the centigram. A shows the milligram. The divisions of the stere or ton are shown in the same manner.

The foregoing is sufficient to explain the illustrative character of my model. Its application to the teaching of other mathematical subjects—such as addition, subtraction, multiplication, division, fractions, and subjects growing out of these—will be obvious to instructors.

The peculiar construction of the model, whereby its parts may be readily distinguished and handled, enables the teacher to fully illustrate the subjects under treatment.

Having thus described my invention, what I claim as new, and desire to secure by Letters Patent, is—

1. A metric model composed of a cube of suitable material having a separable one-tenth part on one side, said part being divided into tenths and one of said tenths having a separable cube forming a one-tenth part of it, substantially as herein described.

2. A metric model composed of a cube of suitable material having a separable one-tenth part on one side thereof, said part being divided into ten equal strips hinged together and one of said strips having divided from and hinged to its end a cube forming a one-tenth part of said strip, substantially as herein described.

In witness whereof I have hereunto set my hand.

JAMES McCOURT.

Witnesses:
E. C. MINTON,
GEO. GRISWOLD.